United States Patent
Ivov et al.

(10) Patent No.: US 10,244,011 B2
(45) Date of Patent: *Mar. 26, 2019

(54) MULTIPLEXING SESSIONS IN TELECOMMUNICATIONS EQUIPMENT USING INTERACTIVE CONNECTIVITY ESTABLISHMENT

(71) Applicant: ATLASSIAN PTY LTD, Sydney (AU)

(72) Inventors: Emil Ivov, Austin, TX (US); Boris Grozev, Austin, TX (US); Georgios Politis, Austin, TX (US)

(73) Assignee: ATLASSIAN PTY LTD, Sydney (AU)

( * ) Notice: Subject to any disclaimer, the term of this patent is extended or adjusted under 35 U.S.C. 154(b) by 0 days.

This patent is subject to a terminal disclaimer.

(21) Appl. No.: 15/937,626

(22) Filed: Mar. 27, 2018

(65) Prior Publication Data

US 2018/0227335 A1    Aug. 9, 2018

Related U.S. Application Data

(63) Continuation of application No. 15/582,396, filed on Apr. 28, 2017, now Pat. No. 9,961,117, which is a
(Continued)

(51) Int. Cl.
*H04L 29/06* (2006.01)
*H04N 7/14* (2006.01)
(Continued)

(52) U.S. Cl.
CPC ...... *H04L 65/1069* (2013.01); *H04L 61/2007* (2013.01); *H04L 61/2575* (2013.01);
(Continued)

(58) Field of Classification Search
CPC ............... H04L 61/2575; H04L 65/403; H04L 61/2589; H04L 61/2514; H04L 67/141;
(Continued)

(56) References Cited

U.S. PATENT DOCUMENTS 7,788,383 B2 * 8/2010 Andreasen ........ H04L 29/12528
709/227
8,312,169 B2 * 11/2012 Perumal ............ H04L 29/12528
709/238
(Continued)

OTHER PUBLICATIONS

Beda et al., "XEP-0176: Jingle ICE-UDP Transport Method", XMPP Standards Foundation, dated 1999-2016, 28 pages.

*Primary Examiner* — Abdullahi E Salad
(74) *Attorney, Agent, or Firm* — Hickman Palermo Becker Bingham LLP

(57) ABSTRACT

A data processing method comprising receiving, at a proxy associated with a plurality of ICE endpoint computers, a datagram from a client computer for a specific ICE endpoint computer of the plurality of ICE endpoint computers, wherein the datagram comprises a username generated by the specific ICE endpoint computer, and wherein the username has been sent to a server computer by the specific ICE endpoint computer for use in establishing a session between the specific ICE endpoint computer and the client computer, in response to attributes of the datagram not matching an entry in a table of the proxy, extracting an identifier from the username, forwarding, by the proxy, the datagram to the specific ICE endpoint based on the identifier.

9 Claims, 4 Drawing Sheets

Related U.S. Application Data continuation of application No. 15/281,811, filed on Sep. 30, 2016, now Pat. No. 9,674,140.

(51) Int. Cl.
*H04L 29/12* (2006.01)
*H04L 29/08* (2006.01)

(52) U.S. Cl.
CPC ........ *H04L 61/2589* (2013.01); *H04L 65/403* (2013.01); *H04L 67/141* (2013.01); *H04L 67/2814* (2013.01); *H04L 67/42* (2013.01); *H04N 7/147* (2013.01); *H04L 61/2514* (2013.01)

(58) Field of Classification Search
CPC .. H04L 61/2007; H04L 65/1069; H04N 7/147
See application file for complete search history.

(56) References Cited

U.S. PATENT DOCUMENTS

| | | | |
|---|---|---|---|
| 8,356,344 B2* | 1/2013 | Lin | H04L 29/12424 726/11 |
| 2009/0006633 A1* | 1/2009 | Moore | H04L 65/1069 709/228 |
| 2014/0267568 A1* | 9/2014 | Star | H04L 12/1818 348/14.08 |
| 2015/0232381 A1* | 8/2015 | Niven | C04B 7/26 106/709 |
| 2015/0381455 A1* | 12/2015 | Martinsen | H04L 65/608 370/252 |
| 2016/0380966 A1* | 12/2016 | Gunnalan | H04L 65/60 709/226 |
| 2018/0097852 A1 | 4/2018 | Ivov et al. | |

* cited by examiner

MULTIPLEXING SESSIONS IN TELECOMMUNICATIONS EQUIPMENT USING INTERACTIVE CONNECTIVITY ESTABLISHMENT

BENEFIT CLAIM

This application claims the benefit under 35 U.S.C. § 120 as a Continuation of application Ser. No. 15/582,396, filed Apr. 28, 2017, which itself is a Continuation of application Ser. No. 15/281,811 filed Sep. 30, 2016, the entire contents of both are hereby incorporated by reference as if fully set forth herein. The applicants hereby rescind any disclaimer of claim scope in the parent application(s) or the prosecution history thereof and advise the USPTO that the claims in this application may be broader than any claim in the parent application(s).

TECHNICAL FIELD

The technical field of the present disclosure is computer hardware, software and computer systems for establishing communication for a multimedia session. The technical field of the disclosure also is computer hardware, software and systems that are programmed for multiplexing Interactive Connectivity Establishment (ICE) sessions.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In local area networks, internetworks and networking infrastructure such as packet routers and switches, Network Address Translation (NAT) is used to remap a given Internet Protocol (IP) address into a different IP address and/or port number. Typically, remapping comprises modifying the IP address in the packet header of a datagram while the datagram is in transit across a network. NAT may be used, for example, to share a single public IP address to represent an entire private network to external systems without revealing the local IP addresses used within the private network.

However, establishing and maintaining connections that are based on an offer/answer protocol are challenging when NAT is involved. While many solutions have been proposed, each has limitations or weaknesses. Additional solutions are needed.

DETAILED DESCRIPTION OF EXAMPLE EMBODIMENTS

Figure 1:
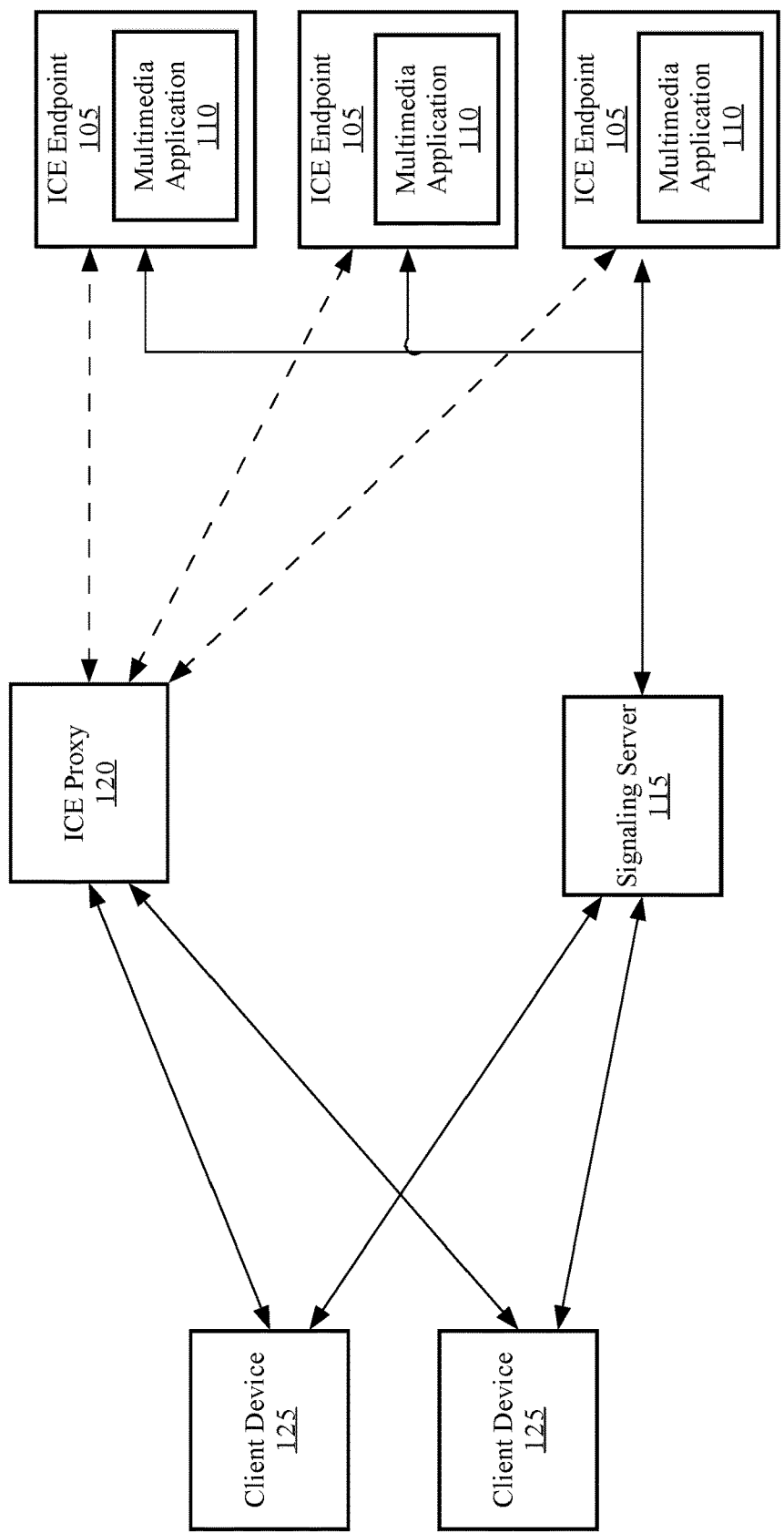
FIG. 1 illustrates an example computer system in which the techniques described may be practiced, according to one embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Computer-implemented techniques are provided for multiplexing Interactive Connectivity Establishment (ICE) sessions in computers such as internetworking equipment and end stations. Specifically, in various programmable algorithms, ICE endpoint computers encode an identifier in a username that is sent to a signaling server that assists in establishing an ICE session. The identifier includes information needed to identify the associated ICE endpoint computer, such as an IP address or port number. When a client computer requests to begin an ICE session, the signaling server provides the client with the username and other necessary data. Then, when the client computer sends a message to an ICE proxy, the ICE proxy determines whether a username with an encoded identifier is present. If the username is present, the ICE proxy extracts the identifier and uses the identifier to translate and forward the message to the appropriate ICE endpoint. In one embodiment, the process is performed without coordination or preparatory communication between the ICE proxy and the ICE endpoint. In another embodiment, there may be coordination or preparatory communication between the ICE proxy and the ICE endpoint.

In one embodiment, a data processing method comprises generating, by each Interactive Connectivity Establishment (ICE) endpoint computer of a plurality of ICE endpoints, a username comprising an identifier, wherein the plurality of ICE endpoints are accessible through a single Internet Protocol (IP) address and port number pair; sending, by each ICE endpoint, at least the username to a server computer for use in establishing a session between a specific ICE endpoint of the plurality of ICE endpoints and a client computer; receiving, at a proxy associated with the plurality of ICE endpoints, a datagram from the client computer for the specific ICE endpoint, wherein the datagram comprises the username; in response to attributes of the datagram not matching an entry in a table of the proxy, extracting the identifier from the username; forwarding, by the proxy, the datagram to the specific ICE endpoint based on the identifier.

Other embodiments, aspects and features will become apparent from the disclosure as a whole.

Protocol Overview

Familiarity with aspects of various Requests for Comment (RFCs) published by the Internet Society or Internet Engineering Task Force is presumed for purposes of understanding the present disclosure. ICE is defined in RFC 5245. Revised Simple Traversal of User Datagram Protocol (UDP) Through NAT (Revised STUN) is described in RFC 5389. The reader and user of the present disclosure is presumed to possess copies of and to understand RFC 5245 and RFC 5389 and to have a sufficient level of knowledge and skill to apply RFC 5245 and/or RFC 5389 to computer(s) in a network. A brief overview follows.

ICE is a programmed technique for NAT traversal for UDP-based media and other data streams. In particular, ICE allows computers to discover enough information about the topologies of two networked devices, such as a media device and a client computer, to permit finding or identifying one or more paths by which the two devices can communicate. In other words, using ICE, a first device is able to establish a media session with a second device without any prior data about whether the second device is behind one or more NATs.

To achieve this process, computers implementing ICE include multiple pairs of IP and port values in a sorted order in certain communications, and test each pair of values until a successful connection can be made. However, when the successful connection is at a NAT router, then the IP and port pair belongs to an ICE proxy, not the media or client device. In such a scenario, it is challenging or impossible for multiple media or client devices to share the same IP and port pair. Allowing multiple media servers and/or client computers to easily connect using a single IP address and port pair would improve the efficiency, usability, and speed of ICE sessions.

Other versions of ICE, such as ICE Lite, are consistent with and usable with the embodiments described herein. ICE Lite is useful when a public Internet accessible IP address is always available for an ICE endpoint. ICE Lite is intended as a stepping stone to a full ICE implementation.

Revised STUN is a protocol that is commonly used with ICE and serves as a tool for other protocols in accomplishing NAT traversal. However, STUN alone is not a solution to NAT traversal. Although many aspects of STUN are discussed in the RFC that defines STUN, the username attribute is relevant to the present disclosure. In STUN, authentication mechanisms may involve a randomly generated username, password, and message-integrity value. Particularly for using STUN with ICE, the username and password are exchanged out of band, such as via a signaling server. The RFC defining ICE explains that the "ice-pwd" and "ice-ufrag" attributes are used for message integrity, and must be chosen randomly at the beginning of a session. The username and password attributes are included with certain datagrams in establishing or maintaining an ICE session.

Example Computer System Implementation

FIG. 1 illustrates an example computer system in which the techniques described may be practiced, according to one embodiment. In an embodiment, a computer system comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1 illustrates ICE endpoints 105, multimedia applications 110, signaling server 115, ICE proxy 120, and client devices 125. Client devices 125 are communicatively connected to ICE proxy 120 and to signaling server 115 using any wired and/or wireless connection, such as a Local Area Network (LAN), a Wide Area Network (WAN), the Internet, or a company network. Signaling server 115 also is communicatively connected to ICE endpoints 105 using any wired and/or wireless connection, such as a LAN, WAN, the Internet, or a company network. The ICE proxy 120 is also communicatively connected to ICE endpoints 105 using any wired and/or wireless connection such as a LAN, WAN, the Internet, or a company network. Although, as indicated by broken lines, ICE proxy 120 does not need to setup or establish communication with ICE endpoints 105 before forwarding or redirecting messages to the proper ICE endpoint, as discussed below.

Each of the ICE endpoints 105 may be any computing device, including but not limited to: servers, racks, work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, and the like. Although FIG. 1 shows ICE endpoints 105 as individual devices, each ICE endpoint may be multiple devices, such as a server cluster, and may be located in one or more physical locations. The ICE endpoints 105 are communicatively connected to signaling server 115, ICE proxy 120, and/or client devices 125 through any kind of computer network using any combination of wired and wireless communication, including, but not limited to: a LAN, a WAN, the Internet, or a company network. ICE endpoints 105 may host or execute a multimedia application 110, and may include other applications, software, and other executable instructions to facilitate various aspects of embodiments described herein.

In one embodiment, each of the ICE endpoints 105 may be a selective forwarding unit (SFU) or multipoint control units (MCU) used for audio or video conferencing. MCUs receive and process audio and video data from clients and typically mix the audio and video to create a single composite video. The composite video is then streamed to the clients in a single mix. While this solution enables relatively simple client software, the processing power needed for the MCU is high, and the resulting presentation at the client is generally inflexible. SFUs, in contrast, are more similar to packet data routers, as SFUs forward packets without media processing. Although three ICE endpoints are shown in FIG. 1, any number of ICE endpoints may be used, such as one, ten, or more.

Multimedia application 110 is a multimedia application executing on an ICE endpoint. Multimedia application 110 may be used for audio or video conferencing, or any other use consistent with ICE. Additional instances of multimedia application 110, and/or different versions of multimedia application (such as a client version), may optionally execute on client devices 125 to provide some of the functionality needed to implement this invention. In one embodiment, multimedia application 110 comprises program instructions that are programmed or configured to send and receive messages and data using ICE and/or STUN (as well as any other suitable protocols) for establishing an ICE session and exchanging media using the ICE session. Multimedia application 110 may establish any number of ICE sessions simultaneously, such as hosting or participating in an audio or video conference with five, ten, or more client devices.

In one embodiment, multimedia application 110 comprises program instructions that are programmed or configured to generate a username with an encoded identifier. The username may be generated in any manner, and is at least partially random. In other words, excluding the encoded identifier, the username is random. The requirements of ICE and STUN explain that the username must be randomly generated. The requirements of ICE further clarify that the username must include 24 bits of randomness, although RFC5245 is ambiguous regarding the additional space allocated for the username. By encoding an identifier and including the identifier in the username, the username is not random. The identifier may be encoded in any manner, and may be located at any part or parts of the username. For example, the identifier may be appended to the end of the username, added to the front of the username, or located at one or more predetermined locations in the middle of the username. The identifier may include any information needed to identify the ICE endpoint, such as IP address and port number. The identifier may be protected or obfuscated using any cryptographic or other method, so that the identifier is not in clear plain text in the username. The username with the encoded identifier is sent to signaling server 115 for use in establishing an ICE session with one or more client devices.

In one embodiment, signaling server 115 is a signaling server used for establishing ICE sessions between a particular ICE endpoint and a particular client device. Signaling server 115 may be any computing device, and may execute one or more applications (not shown) to provide the functionality needed for the invention described herein. In particular, signaling server 115 includes functionality to initiate ICE sessions on behalf of an ICE endpoint and a client device. Signaling server 115 may use Session Initiation Protocol (SIP) (described in RFC 3261), Extensible Messaging and Presence Protocol (XMPP) (described in RFC 6120), Jingle (described XEP-0166[0] and XEP-0176[1]), and/or any other suitable protocol to establish an ICE session. As part of establishing an ICE session, signaling server 115 may receive requests from client devices, and determine an appropriate ICE endpoint with which to connect the client device. The determination may be based on the load of the ICE endpoints, the location of a particular media or data item the client wishes to access (such as an ICE endpoint hosting an audio or video conference), or any other basis. As part of establishing an ICE session, signaling server 115 sends data, including a username, to a client device. The username is the username generated by an ICE endpoint, and includes an encoded identifier for the ICE endpoint. Other data sent to the client device may include the IP address and/or port number of a router through which the client device may access the ICE endpoint, such as ICE proxy 120. The embodiments described herein are transparent to signaling server 115, because the username is an attribute that the signaling server provides to client devices 125 during use of the STUN and/or ICE protocol.

In one embodiment, ICE proxy 120 may be any computing device, including but not limited to: servers, racks, work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, or network infrastructure devices including, but not limited to, routers, switches, and other computing and/or infrastructure devices. Although a single ICE proxy 120 is depicted in FIG. 1, any number of ICE proxies or other computers or network infrastructure devices may be used. ICE proxy 120 may execute firmware and/or one or more applications (not shown) that provide the functionality needed to facilitate various aspects of embodiments described herein. ICE proxy 120 includes a publically accessible IP address, through which client devices 125 may communicate with ICE endpoints 105. To facilitate this communication, ICE proxy 120 performs network address translation, which results in datagrams from client devices 120 being forwarded to their intended ICE endpoint.

In one embodiment, ICE proxy 120 comprises program instructions that are programmed or configured to receive datagrams from client devices. These datagrams may or may not be associated with an ICE session, and may be associated with a particular ICE endpoint. To determine which, if any, ICE endpoint a datagram is associated with, ICE proxy 120 may utilize a table that consists of IP address and port value pairs and links IP address and port values of a source, such as a client device, to the IP address and port values of a specific ICE endpoint. In an embodiment with multiple ICE proxies, the table may be shared amongst the ICE proxies. If the received datagram matches an entry in the table, the datagram is translated and forwarded to the ICE endpoint identified in the table. Typically, an entry exists in the table after one or more datagrams from a specific client for a specific ICE endpoint have been received. In other words, a table entry should exist when the received datagram is not the first datagram received for a particular ICE session. If no table entry exists, the ICE proxy 120 needs to determine the ICE endpoint in a different manner. In an alternative embodiment, a formal NAT table may not be used, and any other format or method may be used to match IP address and port value pairs, or otherwise perform the functions discussed above.

In one embodiment, ICE proxy 120 comprises program instructions that are programmed or configured to identify and extract an identifier from a username. The username may be identified in any manner, such as by examining a predetermined location or locations within the username of a datagram consistent with STUN, ICE, and/or other protocols. Once identified, the encoded identifier is extracted and processed, if necessary, to determine the IP address, port number, and/or other identifying information of the ICE endpoint. Processing the identifier may include reversing any cryptographic or other methods of obfuscation, reconstructing the identifier from multiple portions, and/or any other methods. Once determined, the IP address, port number, and/or other identifying information is stored in the table, and used to translate and forward datagrams. Importantly, the ICE proxy 120 does not need to take part in establishing the ICE session, and does not need to communicate with the ICE endpoints prior to forwarding the datagrams. This is possible because all information needed to forward the datagrams to the ICE endpoint is included in the identifier (which the ICE proxy is able to access).

In one embodiment, ICE proxy 120 comprises program instructions that are programmed or configured to implement other aspects needed by the embodiments described herein, such as translating and forwarding datagrams to the intended ICE endpoint, dropping packets, and the like. These aspects may be performed using any suitable method.

In one embodiment, client devices 125 may be any computing devices, including but not limited to: work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, servers, racks, and the like. Although two client devices 125 are shown in FIG. 1, any number of client devices may be present. Client devices 125 are communicatively connected to signaling server 115, ICE proxy 120, and/or ICE endpoints 105 through any kind of computer network using any combination of wired and wireless communication, including, but not limited to: a LAN, a WAN, the Internet, or a company network. Client devices 125 may include applications, software, and other executable instructions to facilitate various aspects of embodiments described herein. In one embodiment, client devices 125 may include client software that is programmed to support video conferencing or audio conferencing. The software may be standalone, may be implemented through a web browser using browser-executable code, or any other suitable application. The invention described herein is transparent to client devices 125.

Example Functional Implementation

Figure 2:
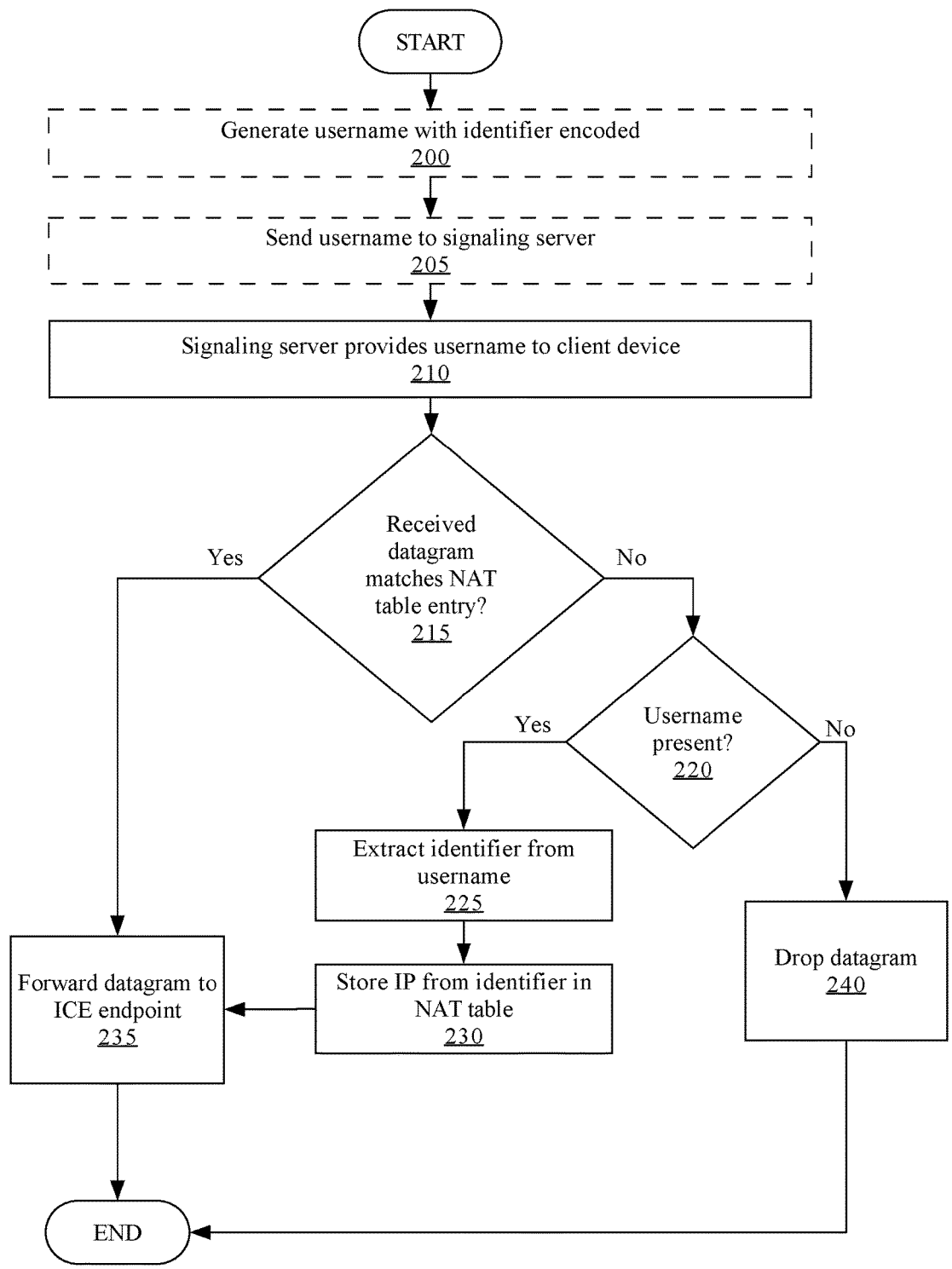
FIG. 2 illustrates a programmable algorithm or method in accordance with an embodiment.

FIG. 2 illustrates an example programmable algorithm or method for multiplexing ICE sessions. Although the steps in FIG. 2 are shown in an order, the steps of FIG. 2 may be performed in any order, and are not limited to the order shown in FIG. 2. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments, at the same level that is used by persons of ordinary skill in the art to which the disclosure pertains for communicating with one another about similar computer programs or algorithms. In other words, each flow diagram in this disclosure is a guide, plan or specification of an algorithm for programming a computer to execute the functions that are described.

In step 200, a username with an encoded identifier is generated. As indicated by the dotted lines, step 200 may occur at any time prior to step 210, and may even be performed in response to a request from the signaling server. Step 200 is performed by an ICE endpoint. The username is partially randomly generated, so that the username may be used for authentication and/or verification. The encoded identifier includes any information needed to identify and communicate with the ICE endpoint associated with the username, such as an IP address and a port number. The identifier may be located in any part or parts of the username, such as the front, back, middle, or multiple places. The identifier may be in plaintext, or may be encoded by a cryptographic or other method, so that the identifier is not clearly visible within the username. By including the identifier in the username, the username is no longer random, as required by ICE and STUN.

In step 205, the username is sent to a signaling server. As indicated by the dotted lines, the username may be sent to the signaling server at any time prior to step 210. In particular, the username may be sent in response to a request from the signaling server, or may be provided preemptively. The username may be sent in any manner or format, such as manner or format consist with STUN, and/or ICE.

In step 210, the signaling server provides the username to a client device. The username is provided to the client device in response to a request from the client device to establish an ICE session, and may be provided in any manner, such as in a format consistent with ICE, STUN, and/or SIP. The signaling server may determine which ICE endpoint is appropriate for the client device based on a variety of factors. For example, the client device may be attempting to access a particular media item, such as a pre-existing audio or video conference, and therefore needs to be connected with a particular ICE endpoint. Alternatively, a client device may be attempting to access a new media item, such as initiating a new audio or video conference, and therefore may not need a particular ICE endpoint, and the decision may be made based on load or other factors.

In step 215, a determination is made whether received datagrams match a NAT table entry. Specifically, the datagrams are received at an ICE proxy, or other suitable device. The determination may be made by searching for whether the source IP address and/or port number exists in the NAT table. If the datagrams match an entry in the NAT table, the method proceeds to step 235. If the datagrams do not match an entry in the NAT table, the method proceeds to step 220. Optionally, an alternative data structure or process may be used in place of a formal NAT table.

In step 220, a determination is made whether a username is present. The username is located within the datagram in a location(s) consistent with an ICE, STUN, or other suitable protocol message, and may be identified by examining the location(s). If a username is not present, the method proceeds to step 240. If a username is present, the method proceeds to step 225.

In step 225, an identifier is extracted from the username. The identifier may be extracted in any manner. The identifier may be located in one or more locations, and may be in plaintext within the username, or may be obfuscated using cryptographic or other methods. If a cryptographic protection was used, the protection is reversed to arrive at the plain text of the identifier. The identifier contains information needed to identify and communicate with a particular ICE endpoint, such as the IP address and port number of the particular ICE endpoint.

In step 230, the IP address from the identifier is stored in the NAT table. The IP address, and any additional information such as a port number, may be stored in the NAT table in any manner. In one embodiment, information is stored in the table using pairs of IP addresses and port numbers, such as (source IP: source port number; endpoint IP: endpoint port number).

In step 235, the datagram is forwarded to the ICE endpoint. The datagram is forwarded using the IP address and/or any additional information included in the NAT table entry or identifier, such as the port number. The datagram is forwarded using any manner and format.

In step 240, the datagram is dropped. The datagram may be dropped in any manner.

Using this process, the use of NAT with ICE is improved. Specifically, setup is easier and less time consuming, as the ICE proxy is no longer required to "know" each ICE endpoint in advance of routing packets to any particular ICE endpoint. Rather, all of the information the ICE proxy needs to route packets to a particular ICE endpoint is contained in the identifier within the username. Another advantage is that this process is transparent to client computers and signaling servers, as their behavior does not change, which greatly increases the ease of use. Further still, the endpoint for an ICE session can be moved from a ICE proxy to the actual media device participating in the ICE session.

The method described above includes additional embodiments. In one embodiment, the ICE endpoint is aware of the IP address and port number of the ICE proxy. This allows the ICE endpoint to communicate the IP address and port number of the ICE proxy to the signaling server, and thereby removes the need for the signaling server to be in communication with the ICE proxy. Thus, in this embodiment, the signaling server and client devices may be transparent to the process. In other words, the signaling server and client devices need not change how they operate or have any special programming or instructions. In another embodiment, the ICE endpoint is not aware of the IP address or port of the ICE proxy, but the signaling server is aware of the IP address and port number of the ICE proxy.

Example Multiplexing of Ice Sessions

Figure 3:
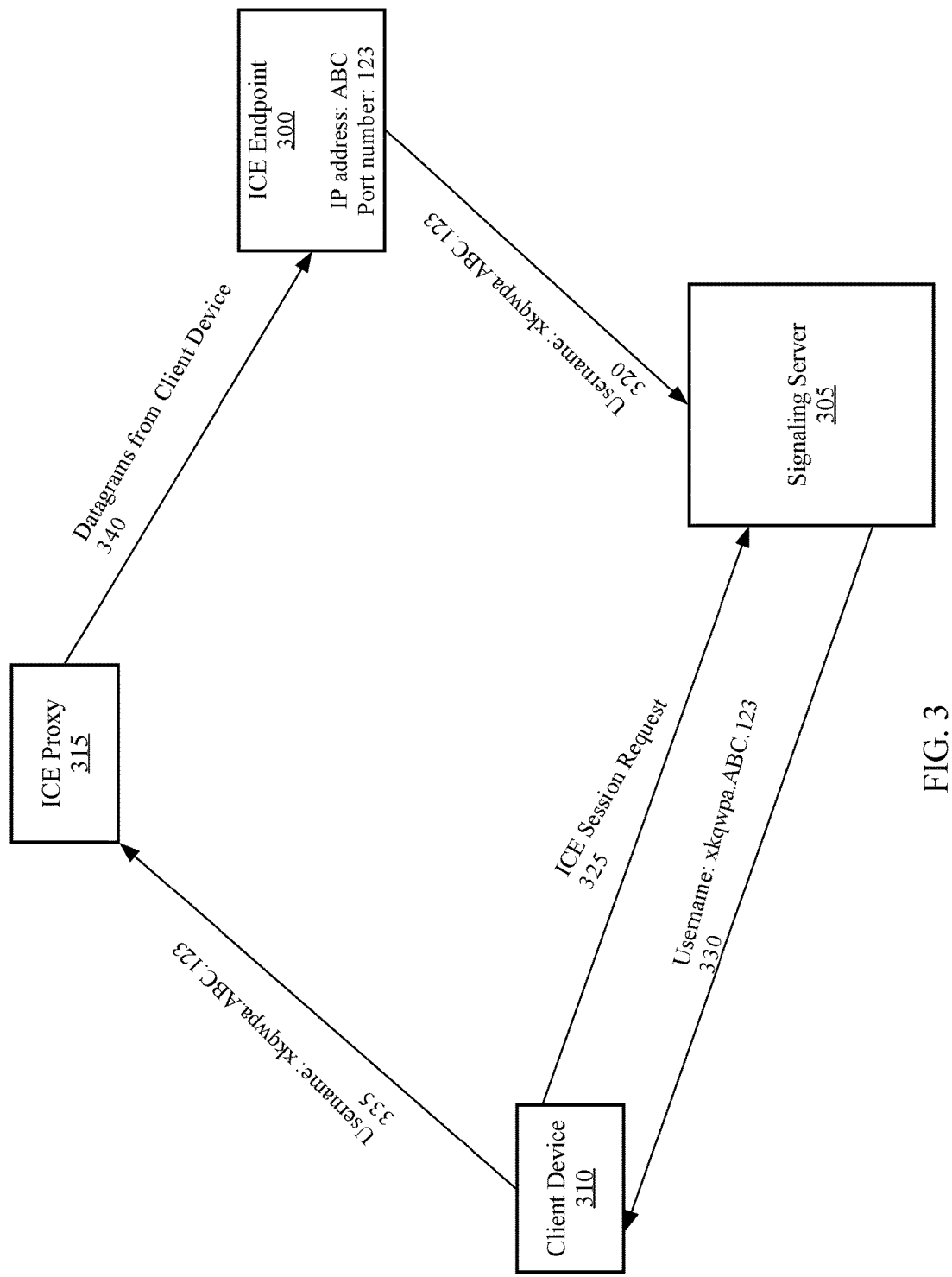
FIG. 3 illustrates an example implementation of multiplexing ICE sessions.

FIG. 3 illustrates an example of multiplexing ICE sessions in accordance with an embodiment.

In the embodiment of FIG. 3, ICE endpoint 300 is a SFU for audio or video conferencing with multiple client devices, such as client device 310. Functional elements shown in FIG. 3 may be coupled for communication via networks in the same manner described herein for FIG. 1.

ICE endpoint 300 has a private IP address of "ABC," and an associated port number of "123," and is accessible through ICE proxy 315, which exposes a public IP address and port to the Internet. As an example, ICE endpoint 300 generates a username "xkqwpa.ABC.123" with an encoded identifier. For this example, the encoded identifier "ABC.123" is appended in plaintext to the end of the username "xkqwpa," which was randomly generated. The username is sent, as shown by arrow 320, to signaling server 305. Signaling server 305 uses the username as part of establishing an ICE session with ICE endpoint 300.

Once signaling server 305 receives an ICE session request 325 from client device 310, the signaling server 305 responds at arrow 330 with data including the username. The response also includes information needed to communicate with ICE proxy 315, such as the public IP address and port for the ICE proxy 315.

Client device 310 then uses the information from signaling server 305 to contact ICE proxy 315, and send to the ICE proxy, at arrow 335, a datagram that includes the username.

Upon receiving a datagram, ICE proxy 315 determines whether there is an entry in the NAT table for the datagram using the IP address and port number of client device 310. Because this is the first datagram received from client device 310, no such entry exists in the NAT table. Thus, ICE proxy 315 inspects the datagram 335 to determine if a username is present. Since the username "xkqwpa.ABC.123" is present, ICE proxy 315 extracts the identifier "ABC.123" from the username, and determines that the IP address of the ICE endpoint for the datagram is "ABC" and the port number is "123." This information is stored in the NAT table with the IP address and port number of client device 310, and is used to translate the datagram and forward the datagrams from the client device, as seen at arrow 340, to ICE endpoint 300. Subsequent datagrams for the same ICE session will be forwarded using the information stored in the NAT table.

As illustrated in the example of FIG. 3, using the embodiments described herein, multiplexing for an ICE session can be easily performed using an encoded identifier in the username, by transforming the digitally stored data values that identify the media server or other suitable computing device. Optionally, the process described herein can be performed without any coordination between the ICE endpoint and the ICE proxy. Alternatively, the ICE endpoint may be aware of the IP address and port associated with the ICE proxy, which would enable the process to be transparent to the client device and signaling server. In other words, the client device and signaling server do not require special programming or modification but can participate in the process unmodified.

Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and program logic to implement the techniques.

Figure 4:
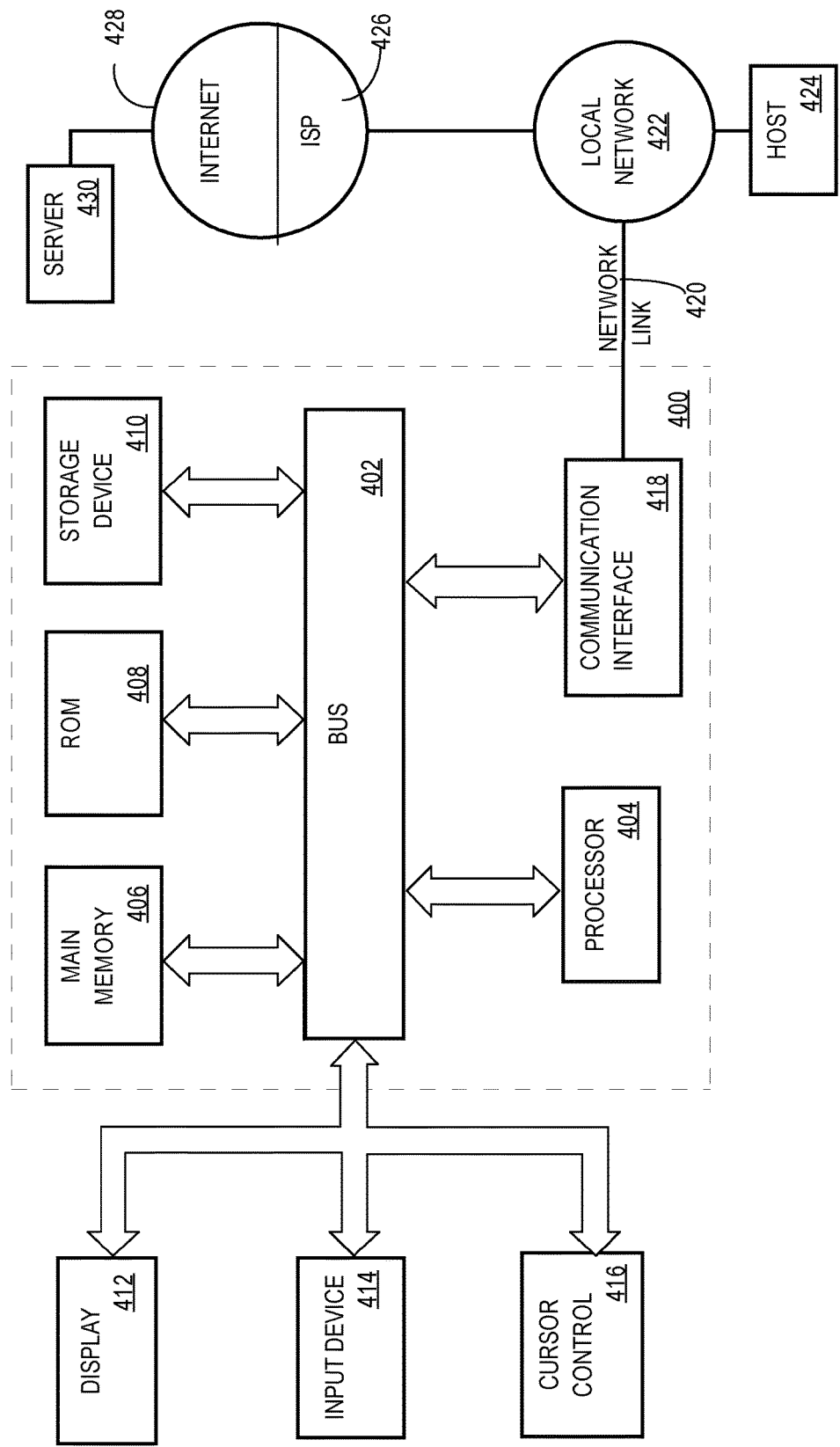
FIG. 4 illustrates a computer system upon which an embodiment may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and instructions that cause a machine to operation in a specific fashion. Such storage media may comprise non-volatile media and volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and stored in storage device 410, or other non-volatile storage for later execution.

Extensions And Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system comprising:
   a proxy associated with a plurality of Interactive Connectivity Establishment (ICE) endpoint computers, the proxy comprising one or more processors and one or more memories storing instructions which, when executed by the one or more processors, cause the one or more processors to:
   receive a datagram from a client computer for a specific ICE endpoint computer of the plurality of ICE endpoint computers, wherein the datagram comprises a username generated by the specific ICE endpoint computer, and wherein the username has been sent to a server computer by the specific ICE endpoint computer for use in establishing a session between the specific ICE endpoint computer and the client computer;
   in response to attributes of the datagram not matching an entry in a table of the proxy, extracting an identifier from the username;
   forwarding the datagram to the specific ICE endpoint based on the identifier.

2. The system of claim 1, wherein the session is for video conferencing.

3. The system of claim 1, the instructions, when executed, further causing the one or more processors to:
   store the identifier in the table.

4. The system of claim 1, wherein the identifier comprises an IP address and a port number.

5. The system of claim 1, the instructions, when executed, further causing the one or more processors to:
   create and store the table as a shared table that is accessible by a plurality of proxies.

6. The system of claim 1, the instructions, when executed, further causing the one or more processors to:
   in response to attributes of the datagram matching a particular entry in the table, forward the datagram based on the particular entry.

7. The system of claim 1, the instructions, when executed, further causing the one or more processors to:
   receive a second datagram from a second client computer for the specific ICE endpoint computer, wherein the second datagram does not include the username;
   in response to attributes of the second datagram not matching an entry in a table of the proxy and the second datagram not including the username, drop the second datagram by the proxy.

8. The system of claim 1, wherein the proxy is programmed to provide Network Address Translation (NAT).

9. The system of claim 1, wherein at least one of the plurality of ICE endpoint computers execute ICE Lite.

\* \* \* \* \*